United States Patent [19]
Stockhowe et al.

[11] Patent Number: 5,772,881
[45] Date of Patent: Jun. 30, 1998

[54] NON-METALLIC SPIN-ON FILTER

[75] Inventors: John W. Stockhowe, Carmi; Larry Dean Michels, Olney, both of Ill.

[73] Assignee: Champion Laboratories, Inc., Albion, Ill.

[21] Appl. No.: 746,430

[22] Filed: Nov. 8, 1996

[51] Int. Cl.[6] .................................................. B01D 27/08
[52] U.S. Cl. ......................... 210/440; 210/441; 210/450; 210/455; 210/457; 210/DIG. 17
[58] Field of Search .................................... 210/350, 352, 210/437, 440, 441, 442, 443, 444, 453, 455, 457, DIG. 17, 450

[56] References Cited

U.S. PATENT DOCUMENTS

| | | | |
|---|---|---|---|
| 3,528,554 | 9/1970 | Ogden et al. | 210/352 |
| 4,521,309 | 6/1985 | Pall | 210/493.2 |
| 4,836,923 | 6/1989 | Popoff et al. | 210/454 |
| 5,556,542 | 9/1996 | Berman et al. | 210/440 |

*Primary Examiner*—Matthew O. Savage
*Attorney, Agent, or Firm*—Olson & Hierl, Ltd.

[57] ABSTRACT

A plastic oil filter comprises a cup-shaped shell with an open end. The shell contains an annular filter media with an elongated opening therethrough. A backplate is positioned in the open end of the shell. An elongated core is positioned in the opening in the filter media. The core is hollow and has a plurality of openings in the walls thereof. A plurality of longitudinally spaced annular rings are formed on the outer surface of the core. Fluid to be filtered can pass through openings in the backplate into the space between the shell and the filter media, through the filter media to be filtered, through the openings in the walls of the core, into the flow passage in the core, and exit from the filter through the flow passage in the core. Sealing washers are provided at each end of the filter media for preventing undesired flow between the core and the ID of the respective sealing washers. Spring structure is formed on the core. In one embodiment, the spring structure functions to bias the sealing washers with respect to the filter media to better seal fluid flow about the ends of the filter media. When assembled, the spring structure enhances the seal between the core and a filter base.

14 Claims, 4 Drawing Sheets

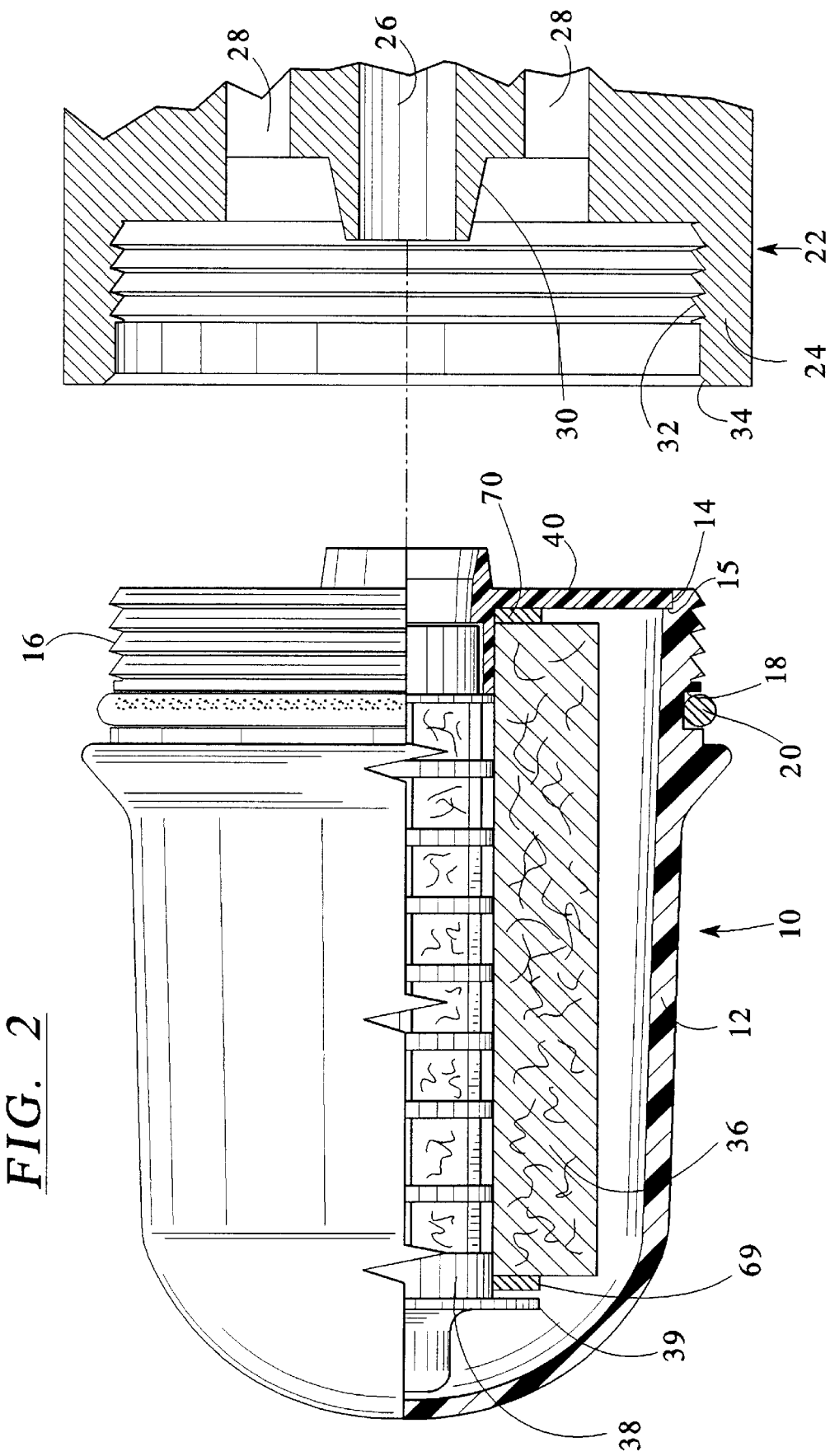

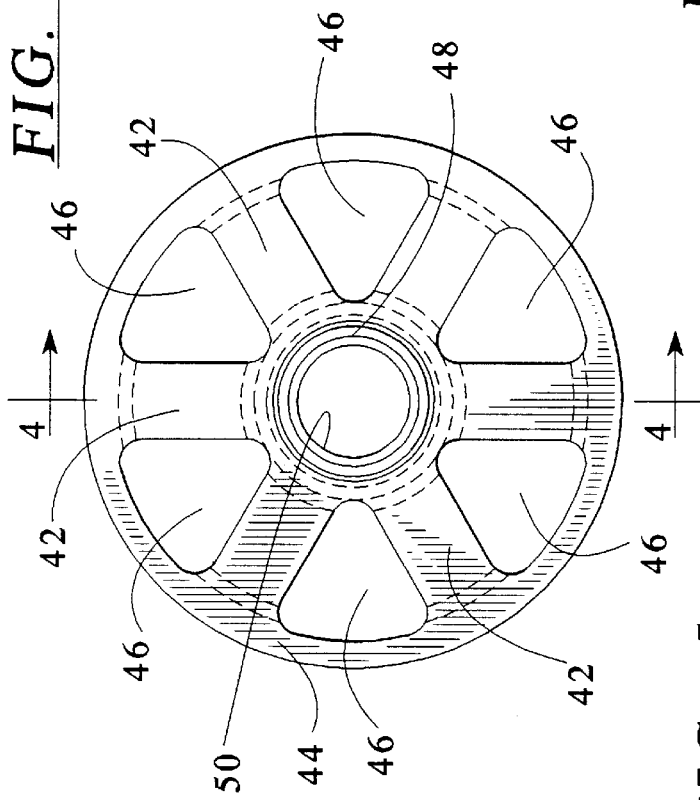
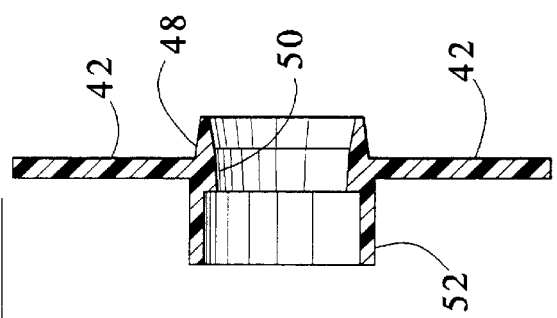
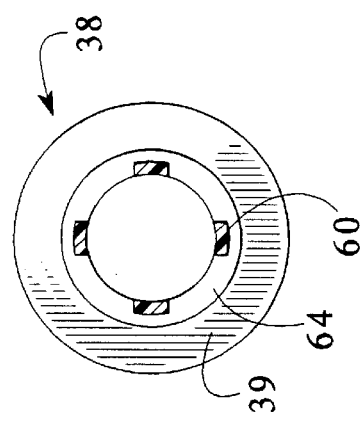
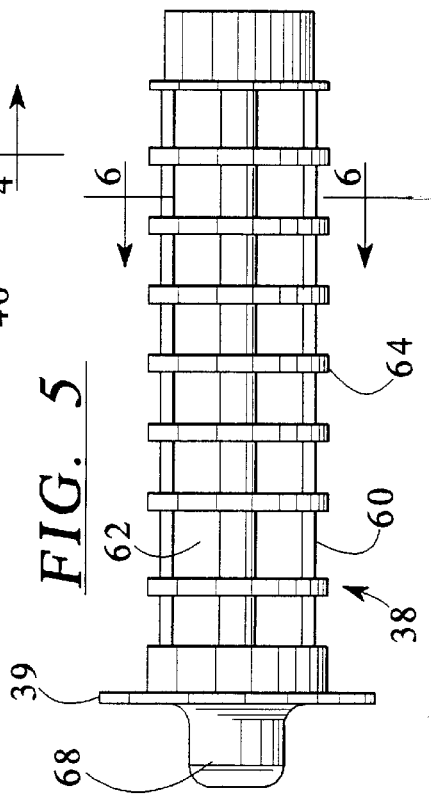
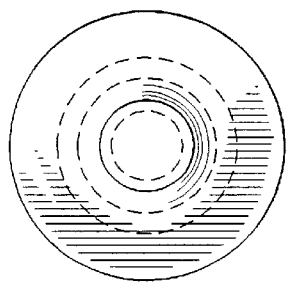

NON-METALLIC SPIN-ON FILTER

BACKGROUND OF THE INVENTION

This invention pertains to a non-metallic spin-on filter, and more particularly, a non-metallic spin-on filter for automotive use having a unique core for channeling the flow of the fluid through the filter media to assure better filtration of the fluid being filtered. The unique core also includes spring means for biasing the filter media within the shell into engagement with sealing washers at each end to effect better sealing engagement of the filter media within the shell to assure that all of the fluid entering the shell passes through the filter media.

Oil filters of various kinds are known in the art. See, for example, Coughlin U.S. Pat. No. 3,985,697 and Girondi U.S. Pat. No. 4,950,400, which disclose filters having external shells or housings and other components made from metal. Prior art patents are known disclosing plastic oil filter assemblies. See, for example, Lowsky U.S. Pat. No. 4,992,166, Beach et al U.S. Pat. No. 5,171,430, and Lee U.S. Pat. No. 5,182,430. These filters would offer advantages over the prior metal oil filters, however, they do not provide the efficiencies of filtration desired, coupled with simplicity of design and lower cost that is afforded by the present invention.

An object of the present invention is to provide an improved plastic spin-on oil filter wherein the disadvantages of prior like oil filters is obviated.

Another object of the present invention is to provide a non-metallic spin-on oil filter for automotive use that has high cleansing or filtering efficiencies due to the unique core arrangement therein and to the unique spring formed integrally on the core for biasing the filter media against sealing washers at each end of the filter media, thereby enhancing the seal between the core and the base when the components are in assembled relationship. This arrangement of components assure that all fluid to be filtered entering the shell will pass through the filter media and be filtered.

Yet another object of the present invention is to provide a non-metallic spin-on filter for automotive use that has relatively few parts and is easily fabricated and assembled for use.

Still another object of the present invention is to provide a non metallic oil filter having fewer parts than like oil filters and that is readily fabricated at relatively lower cost, yet provides high filtration capabilities.

Other objects and advantages of the present invention will become more apparent hereinafter.

BRIEF DESCRIPTION OF THE DRAWING

There is shown in the attached drawing a presently preferred embodiment of the present invention, wherein like numerals refer to like elements in the various views and wherein;

FIG. 2 is a side view of the spin-on filter of the present invention, with part of the casing broken away to better show the interior components of the filter;

FIG. 3 is a plan view of the backplate of the spin-on oil filter of FIG. 1;

FIG. 4 is a cross-section of the backplate taken generally along the line 4—4 of FIG. 3;

FIG. 5 is a side view of the core of the spin-on oil filter of FIG. 1;

FIG. 6 is a cross section of the core taken along the line 6—6 of FIG. 5;

FIG. 7 is a top view of the core of FIG. 5;

DETAILED DESCRIPTION OF THE PRESENT INVENTION

Figure 1:
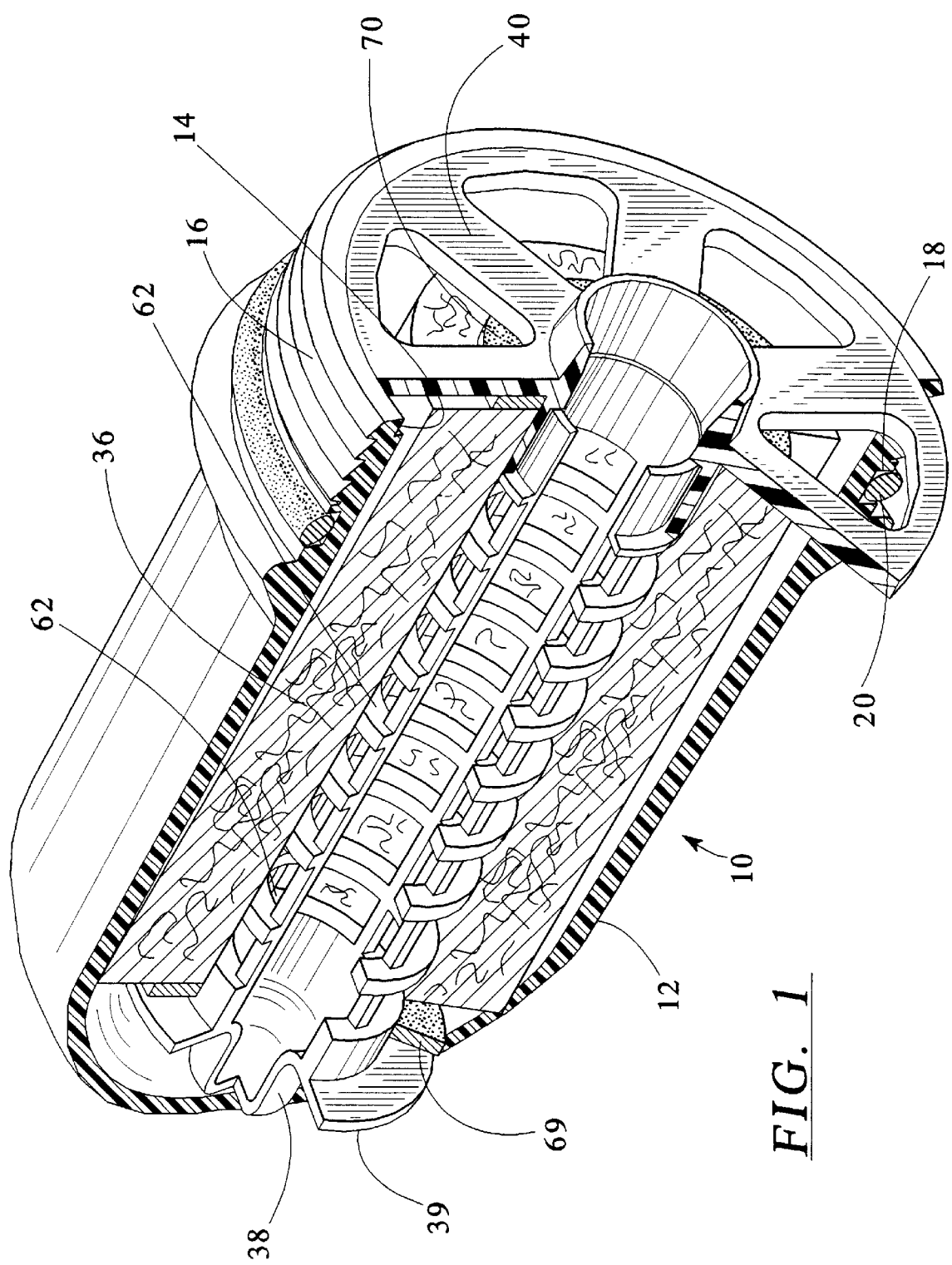
FIG. 1 is a perspective view of the non-metallic spin-on oil filter of the present invention, with part of the casing broken away to better show the interior components of the filter.

There is shown in FIGS. 1–7 of the drawing a first embodiment of the spin-on oil filter of the present invention. The filter 10 includes a generally cup-shaped housing or shell 12 having an open end 14. The shell 12 is made from plastic, for example, a glass filled nylon, that is able to withstand the working environment of a automotive oil filter, that is the demands of temperature and pressure cycles over an extended period of time. The exterior surface of the shell adjacent the open end of the shell is threaded as indicated at 16 to enable connection of the filter 10 to the filter base 22 (FIG. 2) on an automobile engine. Adjacent the end of the threaded portion 16 on the exterior surface of the shell 12 is an annular recess 18 that receives a sealing gasket 20, made from rubber or a like resilient sealing material.

The filter base 22 to which the filter 10 is to be connected is provided with a body 24 having a central passage 26 and additional passages 28. The end of the wall 30 defining the central passage 26 is tapered for a purpose to be explained more fully hereafter. Adjacent the open end of the filter base 22 there is provided internal threads 32 that are complementary to the external threads 16 on the shell 12 and cooperate therewith for the purpose of securing the spin-on oil filter 10 to the filter base 22 for use. The interior wall of the body 24 of the filter base 22 is chamfered as indicated at 34 for the purpose of receiving and sealingly cooperating with the sealing gasket 20 on the shell 12 when the filter 10 is assembled to the filter base 22.

The filter 10 includes a filter media 36 that is carried on a unique core 38 which is disposed between the inner surface of the shell 12 and the backplate 40 that closes the open end of the shell 12.

The backplate 40, that is better shown in FIGS. 3 and 4, includes a plurality of arms 42 that are secured at their inner ends to a central cylindrical hub 48 and an outer annular rim 44. Defined between the arms 42, the rim 44 and the hub 48 are openings 46, which act as supply flow passages for the filtered fluid. The opening 50 in the hub 48 of the backplate 40 which faces the filter base 22 is tapered and cooperates with the tapered end 30 of the central passage 26 in the filter base 22. The inwardly extending portion 52 of the hub 48 engages with the outer end of the core 38.

Turning now to FIGS. 5, 6, and 7, there is better shown the core 38 of the present invention. The core 38 comprises an elongated cylindrical member 60 having a plurality of openings 62 formed in the side wall of the cylindrical member 60. Preferably, the core 38 is made from plastic, such as glass filled nylon. In a preferred embodiment, there are a plurality of openings 62 in transverse alignment through the core 38 between adjacent annular rings 64 formed on the cylindrical member 60. The annular rings 64 extend transversely of the cylindrical member 60 and are spaced longitudinally along the cylindrical member 60 so as to separate the flow of fluid from the filter media 36 into the interior of the core 38 in use. The inner end of the core 38 is provided with a dome extension 68 which is resilient and is somewhat compressed when the filter 10 is assembled on the filter base 22. Thus, the dome extension 68 functions as a spring in use to bias the core 38 toward the backplate 40 and thereby bias the filter media 36 toward the backplate 40 to preclude flow between the end of the filter media 36 and the abutting surface of the backplate 40. As shown in FIG. 1, the core including the annular rings and the resilient dome constitute a single unitary structure formed of a single plastic material. Sealing washers 69 and 70 are provided at each end of the filter media 36 (FIGS. 1 and 2) Sealing washer 69 is positioned on the core 38 between the inner end of the filter media 36 and the flange 39 on the inner end of the core 38, as seen in FIG. 1. Likewise, a sealing washer 70 is positioned on the core 38 between the outer end of the filter media 36 and the adjacent surface of the backplate 40. The sealing washers 69 and 70 provide for radial sealing between the core 38 and the ID of the respective sealing washers. The sealing washers 69 and 70 may be suitably secured to the ends of the filter media 36, for example, by glue or the like, in order to facilitate assembly of the filter 10 or they can be separate from the filter media 36, as will be more fully explained hereinafter.

The spring means provided by the resiliency of the dome extension 68 helps to reduce possible bypass flow around the filter media 36 by helping seal between the inner end of the filter media 36 and the flange 39 on the core 38 (sealing washer 69) and between the outer end of the filter media 36 and the backplate 40 (sealing washer 70).

Figure 8:
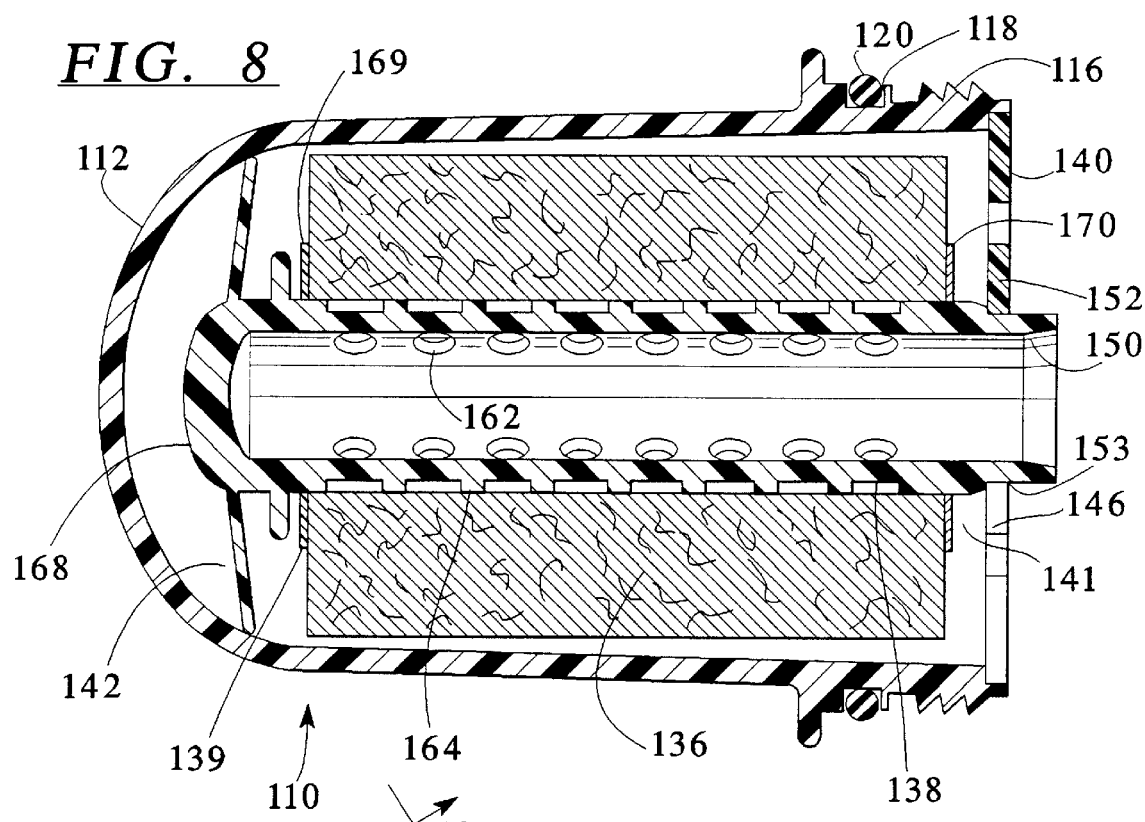
FIG. 8 is a cross section of a spin-on oil filter containing a modified core.
Figure 9:
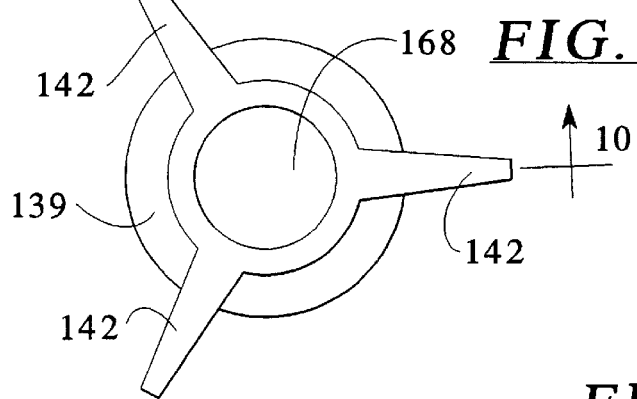
FIG. 9 is an end view of the modified core.
Figure 10:
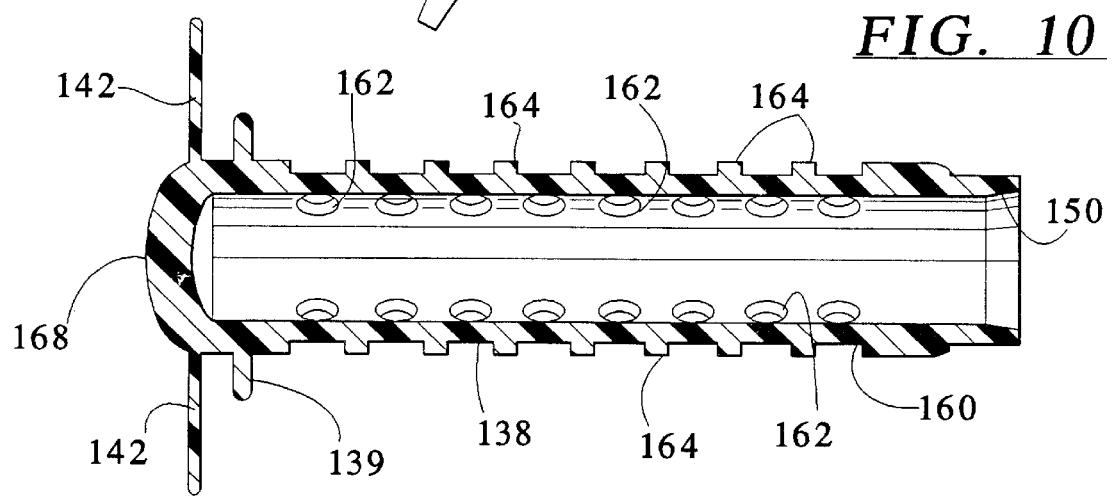
FIG. 10 is a cross section of the modified core taken generally along the line 10—10 of FIG. 9.

In FIGS. 8–10 there is shown a filter 110 with a modified core 138 which is formed much like the core 38 of the first embodiment, but which includes a different form of spring means at the inner end thereof and a different backplate. The backplate 140 has a central opening 153 for slidingly receiving the core 138. The core 138 includes a plurality of transverse projections or arms 142 extending from the dome like member 168 at the inner end of the core 138. The transverse projections or arms 142 are formed integrally with the core 138 and are fabricated, for example, molded, so that there is inherent resiliency in the arms 142. As shown in FIG. 8, the core including the annular rings and the plurality of transverse projections or arms constitute a single unitary structure formed of a single plastic material.

As best seen in FIG. 9, in a presently preferred embodiment of the present invention there are three arms 142 equidistantly spaced from one another.

When the core 138 and the filter media 136 are assembled into the shell 112, the projections or arms 142 are engaged with the inner surface of the shell 112. When the filter 110 is mounted for use, the end of the core 138 engages the member 30 on the filter base 22 and is urged inwardly into the shell 112. The arms 142 are biased. The biasing of the arms 142 enhances the seal between the core 138 and the filter base 22. The sealing washer 169 provides for radial sealing between the core 138 and the ID of the sealing washer 169. The sealing washer 170 provides for radial sealing between the core 138 and the ID of the sealing washer 170.

The filter of FIGS. 1–7 is assembled as follows: the filter media 36 is mounted on the core 38 with a sealing washer 69 between the inner end of the filter media 36 and the flange 39 at the inner end of the core 38. A sealing washer 70 is placed over the inner portion 52 of the hub 44 of the backplate 40. As was noted above the sealing washers 69 and 70 could be joined to the filter media 36 so as to facilitate the assembly of the components. The backplate 40 is positioned with the outer end of the core 38 in the portion 52 of the hub 44 of the backplate 40. The partial assembly of the core 38 and the filter media 36 is slipped into the shell 12 until the backplate 40 is positioned in the open end of the shell 12, with the backplate 40 seated against the shoulder 15 in the wall of the shell 12 adjacent the open end thereof. The backplate 40 is then suitably fastened in position in the shell 12 by fastening mean for example, by sonic welding or by an adhesive. A sealing gasket 20 is then placed into the recess 18 in the shell 12.

The modified filter 110 of FIGS. 8–10 is assembled in a similar fashion. It is observed that the backplate 140 does not include an outwardly extending hub portion, as did the hub 44 of back plate 40. The outer end of the core 138 is slidable within the central opening 153 in the hub portion 152 of the backplate 140 and extends outwardly from the backplate 140 when the filter is assembled so that it can engage the tapered member 30 and bias the spring means therein.

The surfaces 150 and 30 are provided with a complementary taper so as to enhance the sealing relationship of the engaging surfaces of the core 138 and the body 24 of the filter base 22.

For use, the spin-on oil filter 10 (110) is threaded into the filter base 22, with the external threads of the shell 12 (112) engaging with the internal threads of the filter base 22 on the automobile engine. The sealing gasket 20 (120) seals against the end of the filter base body 24. The tapered surface 50 of the backplate 40 engages with the tapered surface 30 within the filter base body 24. In the case of the embodiment of FIGS. 8–10, the tapered surface 150 on the core 138 engages with the tapered surface 30. The seating of the core 38 (138) within the filter base 22 imparts a movement of the core 38 (138) inwardly into the shell 12 (112) so as to load the spring means formed by the dome 68 in the embodiment of FIGS. 1, 2, and 5 or the arms 142 in the embodiment of FIGS. 8–10. The spring means are loaded or biased so as to impart a biasing force to the filter media 36 (136) for urging the filter media 36 (136) toward the open end of the shell 12 (112). In the case of the embodiment of FIGS. 1–7, the sealing forces between the sealing washer 69 and 70 and their respective contact surfaces are increased. In the case of the embodiment of FIGS. 8–10, the spring means enhances the seal between the core 138 and the filter base 22.

When in use, fluid, usually oil, will flow from the supply passages in the filter base 22 into the space between the housing or shell 12 and the filter media 36 (136. The fluid is supplied under pressure and will flow through the filter media 36 (136) into the core 38 (138) through the openings 62 (162) between adjacent annular rings 64 (164). The core 38 (138) will help to channel the flow of fluid though the filter media 36 (136) along its entire length so as to enhance the efficiency and longevity of the filter media 36 (136). It is intended that all fluid to be filtered will pass through the filter media 36 (136) before entering the core 38 (138). Fluid exiting from the core 38 (138) will pass into the return passage 26 in the filter base 22 for return to the engine.

While we have shown a presently preferred embodiment of the present invention, it will be apparent to persons skilled in the art that the invention may be otherwise embodied within the scope of the following claims.

We claim:

1. A non-metallic replaceable filter for automotive use having a generally cup-shaped shell having an open end defining an interior opening and a closed end, a backplate adapted to close the open end of the shell, said backplate including a planar member having a perimeter corresponding to the configuration of the interior opening of said open end of the shell and having additional passages therethrough and a central cylindrical portion extending inwardly therefrom, said cylindrical portion defining a flow passage, and annular filter media in the shell, said filter media having a first end adjacent said back plate and a second end adjacent the closed end of said shell, said filter media having an opening therethrough defining an interior surface of said filter media, a core disposed in the opening through the filter media and cooperating with the backplate and the shell to position and hold the filter media in the shell, said core having a first end slidably received within the flow passage of the central cylindrical portion of said backplate, said core having a second end adjacent the closed end of said shell, said core having a plurality of longitudinally spaced, laterally extending annular rings on a perimeter of said core between the first and second ends of said core for supporting the interior surface of said filter media, and a plurality of holes longitudinally spaced in the core opening between the annular rings, and wherein the second end of said core includes spring means engaging the closed end of the shell for biasing the core and the filter media toward the backplate to help seal undesirable flow between the first end of the filter media and the backplate and the second end of the filter media and the flange of said core, wherein said core including said annular rings and said spring means constitute a single unitary structure formed of a single plastic material, whereby fluid to be filtered will flow through the passages in the backplate, between the shell and the filter media, through the filter media and pass through the holes in the core into the core along the length thereof.

2. A filter as in claim 1, wherein said shell has an external surface and the external surface of the shell adjacent the open end is provided with an external thread for enabling a threaded connection of the filter to a filter base.

3. A filter as in claim 2, wherein an annular recess is provided in the external surface of the shell adjacent the external thread and a sealing gasket is provided in said annular recess for helping to seal the fluid connection between the filter and the filter base in use.

4. A filter as in claim 1, wherein the shell is made from plastic.

5. A filter as in claim 4, wherein the shell is made from glass filled nylon.

6. A filter as in claim 1, wherein the core is made from plastic.

7. A filter as in claim 6, wherein the core is made from glass filled nylon.

8. A filter as in claim 1, wherein the spring means comprises a dome unitarily formed on the second end of the core.

9. A non-metallic filter for automotive use having a generally cup-shaped shell having an open end and a closed end, a backplate adapted to close the open end of the shell, said backplate including a planar member having a perimeter corresponding to the configuration of an interior portion of said open end of the shell and having a central opening and additional passages therethrough, an annular filter media in the shell, said filter media having a first end adjacent said back plate and a second end adjacent the closed end of said shell, said filter media having an opening extending therethrough defining an interior surface of said filter media, an elongated core disposed in the opening through the filter media and cooperating with the backplate and the shell to position and hold the filter media in the shell, said core having a first end extending through the central opening of said backplate, said core having a second end adjacent the closed end of said shell, said core being hollow to define a flow passage and being slidable in the central opening in the backplate, said core having a plurality of longitudinally spaced annular rings on a perimeter between the first and second ends of said core for supporting the interior surface of said filter media, and a plurality of holes in the core that open between the annular rings, wherein the second end of said core includes spring means engaging the closed end of the shell for biasing the core toward the backplate to help seal undesirable flow between the first end of the core and a filter base, wherein said core including said annular rings and said spring means constitute a single unitary structure formed of a single plastic material, whereby fluid will flow through the additional opening in the backplate into the space between the shell and the filter media, through the filter media to be filtered, through the holes in the core into the flow passage in the core, and then pass from the core.

10. A filter as in claim 9, wherein the spring means comprises at least one transverse projection extending from said second end of the core and abutting the closed end of the shell for applying a spring pressure to the second end of the filter media via the flange of said core for urging the first end of the filter media toward firmer engagement with the backplate when the filter is assembled on a filter base for use.

11. A filter as in claim 10, wherein the spring means comprises a plurality of transverse projections from the core and engaging the inner surface of the shell.

12. A filter as in claim 9, wherein the shell and core are made from glass filled nylon.

13. A filter as in claim 9, wherein sealing washers are are secured to the first and second ends of the filter media for radially sealing against said core.

14. A filter as in claim 13, wherein the spring means comprises a resilient member projecting from the second end of the core and the engaging the closed end of the shell and being loaded by relative movement of the core within the shell when the filter is assembled onto a filter base for use.

\* \* \* \* \*